Patented Mar. 10, 1942

2,275,809

UNITED STATES PATENT OFFICE 2,275,809

REACTION OF EPINEPHRINE WITH AMINO ACIDS AND PRODUCTS THEREOF

Richard G. Roberts, Chicago, Ill.

No Drawing. Application February 9, 1939,
Serial No. 255,492

2 Claims. (Cl. 260—501)

This invention is concerned with the preparation of new and valuable compounds which can be characterized as addition compounds or "conjugates" of epinephrine with amino acids.

It has been observed that blood pressure increases are obtained in experimental animals after they have been injected with epinephrine but the effects are relatively transitory. For example, in dogs this elevation has been observed to last only about ten minutes. It has also been a recognized practice to treat patients allergic to various substances with epinephrine or epinephrine hydrochloride. In these instances, also, it has been a disadvantage that the effect of the epinephrine or epinephrine hydrochloride has not been of sufficient duration and the patients have required frequent and costly treatment.

Various workers have attempted to produce substances which would prolong the action of epinephrine without concomitant ill effects on the patient. For example, it has been proposed to produce a "slow epinephrine" by suspending epinephrine base in olive or peanut oil and it was found that subcutaneous injections of this composition gave a much prolonged relief from asthmatic symptoms. However, these oil depots are not well tolerated by some subjects and may remain in the patient for from two to three weeks.

I have set myself to the problem of so-modifying epinephrine that its action is greatly prolonged, thus rendering it unnecessary to prescribe repeated injections in order to maintain the effect of the epinephrine on the human system. It is a further object of my invention to provide epinephrine compounds which can be used for subcutaneous injection with such vehicles as glycols, glycerols or triacetin, which substances are not as irritating as vegetable oils.

And I have discovered that epinephrine will combine with certain organic compounds to form addition products. The exact constitution of such addition products is not clear, but I conceive of them as molecular addition products containing both epinephrine and the added organic compounds. These products may be somewhat analogous to the formation of organic salts, such as amine hydrochlorides, but I do not wish to be bound to any particular theory with respect to the formation of my product. One convenient way of referring to them is by defining them as conjugates. For example, I find that a molecule of epinephrine will combine with a molecule of an amino acid. Epinephrine will also combine to form addition products with hydroxy-containing organic compounds, such as the sugars. The proteins, urea, lactic acid, ascorbic acid, and cholesterol will all form epinephrine conjugates having the property of greatly prolonging the effectiveness of the epinephrine after injection.

In most instances the organic compound combining with the epinephrine is valuable to the animal organism itself. Many of the amino acids, which are substances which I can use for forming epinephrine conjugates, are essential to life and all of them are present as building stones in the animal organism.

The most important advantage inherent in my products is the fact that the effect of administration is greatly prolonged. For example, dogs injected intravenously with the compounds of the present invention show an increase in blood pressure which lasts for as long as three hours. The same quantity of pure epinephrine base produces an effect lasting for only ten minutes.

Similarly in treating subjects suffering from asthma, it has been found possible to produce relief from symptoms for from twelve to eighteen hours by a single subcutaneous injection of compounds with which this invention is concerned. On the other hand, individuals who have been treated with epinephrine hydrochloride have required as many as three to six injections per day and as many as four per night.

The products which are the subject of this invention are prepared by mixing suitable proportions of epinephrine and amino acid or a mixture of amino acids or protein, such as protamine or gelatin, or ascorbic acid, dextrose, lactic acid or cholesterol together in a suitable solvent, as, for example, anhydrous liquid ammonia or methyl amine or ethylamine. Upon completion of the reaction the solvent is allowed to boil off, the last traces being removed, if desired, by vacuum.

Following are examples showing how these compounds may be prepared:

Example 1

244 mgms. of dry epinephrine powder are mixed well with 100 mgms. of dry glycine. This mixture is then added to 200 cc. of liquid ammonia which has been previously dried over metallic sodium. The mixing should take place rapidly and in the absence of moisture or moist air. The container is suitably glass or glass-lined and is insulated to prevent too rapid boiling off of the ammonia gas. The gas is allowed to escape over a period of about 24 hours, thru a mercury seal to prevent the readmittance of air or moisture. The residue in the vessel, which is the desired conjugate formed by the addition of glycine to epinephrine in equimolar proportions is kept sealed from the atmosphere so that it will not take up moisture.

The reaction proceeds smoothly at $-33.5°$ C. in liquid ammonia.

Example 2

150 mgms. of glutamic acid were reacted as above, in liquid ammonia, with 149.7 mgms. of epinephrine. The product obtained was a yellowish powder, slightly soluble in liquid ammonia and yielding a sol with ethylene glycol.

Example 3

150 mgms. of dextrose are mixed well with 152.5 mgms. of epinephrine and the total mixture added to 200 cc. of liquid ammonia in a suitable container and the reaction allowed to proceed as above. The residue is soluble in ethylene glycol and moderately soluble in liquid ammonia.

Example 4

200 mgms. of ascorbic acid were thoroughly mixed with 208.1 mgms. of epinephrine and the reaction carried out as in Example 1. The residue is a yellowish-white powder which is moderately soluble in liquid ammonia and which forms a dispersion in ethylene glycol.

Example 5

125 mgms. of lactic acid were added to 254 mgms. of epinephrine and the reaction carried out as in Example 1. The product obtained is a thick oil, soluble in ethylene glycol and slightly soluble in liquid ammonia.

Example 6

100 mgms. of epinephrine are mixed with 211 mgms. of cholesterol and reacted in liquid ammonia. The product is a whitish amorphous powder, slightly soluble in liquid ammonia.

Example 7

65.6 mgms. of urea were reacted in liquid ammonia with 200 mgms. of epinephrine. The product was a brown powder, soluble in liquid ammonia and dispersible in ethylene glycol.

Example 8

186.6 mgms. of gelatin were reacted in the same manner with 183.1 mgms. of epinephrine. The product was obtained in the form of brownish-yellow scales, slightly soluble in liquid ammonia and yielding dispersions with ethylene glycol.

The reactions are suitably carried out at temperatures at which the solvents used are liquid, for example, at $-33.5°$ C. in liquid ammonia or at $-6.5°$ C. in methylamine. The reaction is conveniently carried out at ordinary pressures, but the pressure may be elevated or reduced.

The relative proportions of epinephrine and its conjugate-forming organic constituent can be varied over wide limits. I generally use equimolecular equivalents so that about one mol of epinephrine reacts with about one mol of the organic compound. But these quantities need not be restricted. An excess of epinephrine does no harm since in that case the final product is composed of a mixture of epinephrine and the epinephrine addition product. The presence of the epinephrine addition product prolongs the effect of the epinephrine and I can, in consequence, deliberately prepare mixtures of epinephrine base, or epinephrine hydrochloride, together with an epinephrine addition product.

The products obtained according to this invention may be dissolved or dispersed in ethylene glycol, propylene glycol, glycerol or glycerine triacetate (triacetin) for injection purposes. A marked advantage of these products is that they can also be given intravenously by a very slow injection of the diluted conjugate, avoiding the production of extremely high blood pressure as would result from the use of epinephrine, yet obtaining a prolonged effect since the conjugate is not as rapidly oxidized and destroyed in the blood stream as epinephrine would be. In other words, these conjugates resemble the vegetable alkaloid ephedrin, somewhat but do not cause nausea, vomiting etc., as does ephedrin.

Furthermore, it has been observed that these conjugates maintain a stronger heart beat than epinephrine and do not have a depressor action following the pressor action. These phenomena are as desirable therapeutically as the prolongation of the pressor action.

My invention is broadly concerned with the formation of conjugates of epinephrine and compounds which contain certain groups possessing an easily replaceable hydrogen atom, such as an amino, an hydroxyl or a carboxyl group. The compounds which may be used have been described. The products obtained have valuable therapeutic properties and definite physical and chemical characteristics, although their exact chemical constitutions have not as yet been determined.

Having thus described my invention, what I claim is:

1. The process of preparing an epinephrine addition product which comprises admixing epinephrine and an amino acid with a non-aqueous, low-boiling solvent chosen from the group consisting of liquid ammonia, methylamine and ethylamine, allowing reaction to occur in said solvent, and vaporizing the solvent from the epinephrine-amino acid addition product thus formed.

2. A conjugate of epinephrine and an amino acid.

RICHARD G. ROBERTS.